United States Patent [19]

Heath et al.

[11] Patent Number: 5,749,629

[45] Date of Patent: May 12, 1998

[54] CONSOLE ASSEMBLY WITH ADJUSTABLE ARMREST

[75] Inventors: Gerald Arthur Heath, Canton; Kelly Michael Obriot, Dearborn; Ionel Eugene Simplicean, Dearborn Hgts.; Sorin Stancu, Detroit, all of Mich.

[73] Assignee: Ford Motor Company, Dearborn, Mich.

[21] Appl. No.: 784,699

[22] Filed: Jan. 16, 1997

[51] Int. Cl.⁶ .................................... A47C 7/54
[52] U.S. Cl. .............. 297/411.36; 248/631; 297/118.15; 297/118.21
[58] Field of Search .............. 297/188.14, 188.15, 297/188.19, 188.21, 411.36; 248/404, 631

[56] References Cited

U.S. PATENT DOCUMENTS

| | | |
|---|---|---|
| 2,678,682 | 5/1954 | Thomas . |
| 2,726,710 | 12/1955 | Cutler ........................... 297/188.19 X |
| 3,356,409 | 12/1967 | Belsky et al. ........................... 296/24 |
| 4,674,790 | 6/1987 | Johnson ........................... 297/411.36 X |
| 4,934,750 | 6/1990 | Eichler et al. . |
| 5,112,094 | 5/1992 | Kribs . |
| 5,116,099 | 5/1992 | Kwsnik et al. ........................... 297/188.15 |
| 5,131,716 | 7/1992 | Kwasnik et al. ........................... 297/188.19 X |
| 5,382,079 | 1/1995 | Wilson et al. . |
| 5,556,017 | 9/1996 | Troy ........................... 297/188.14 X |
| 5,636,899 | 6/1997 | Schiff et al. ........................... 248/631 X |

Primary Examiner—Peter R. Brown
Assistant Examiner—Stephen Vu
Attorney, Agent, or Firm—David B. Kelley

[57] ABSTRACT

A console assembly in an automotive vehicle has a center console positioned between a pair of seats and a storage compartment with a lid having an armrest on an outer surface, the storage compartment being diagonally adjustable with respect to the console to provide an adjustable armrest for an occupant. The console has a mounting well and an auxiliary storage compartment therein. A telescoping member is angularly mounted with respect to a vertical axis for simultaneously adjusting the storage compartment both in a vertical direction and in a fore-aft direction with respect to the console, the telescoping member mounted to a storage compartment bottom of the second storage compartment on a first end and mounted within the mounting well on a second end. A stabilizing rod is mounted substantially parallel to the at least one telescoping member for preventing rotation of the second storage compartment about the telescoping member. The storage compartment has a slide bracket attached to the storage compartment bottom for horizontally adjusting the storage compartment relative to the console to provide additional adjustment.

5 Claims, 3 Drawing Sheets

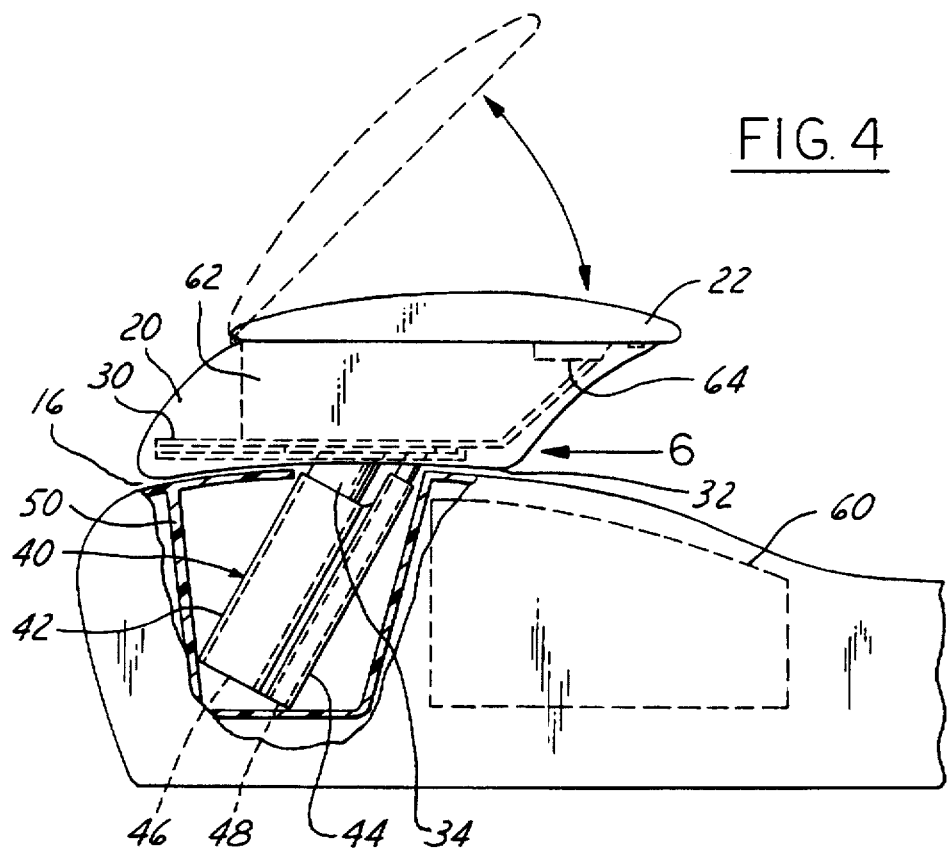
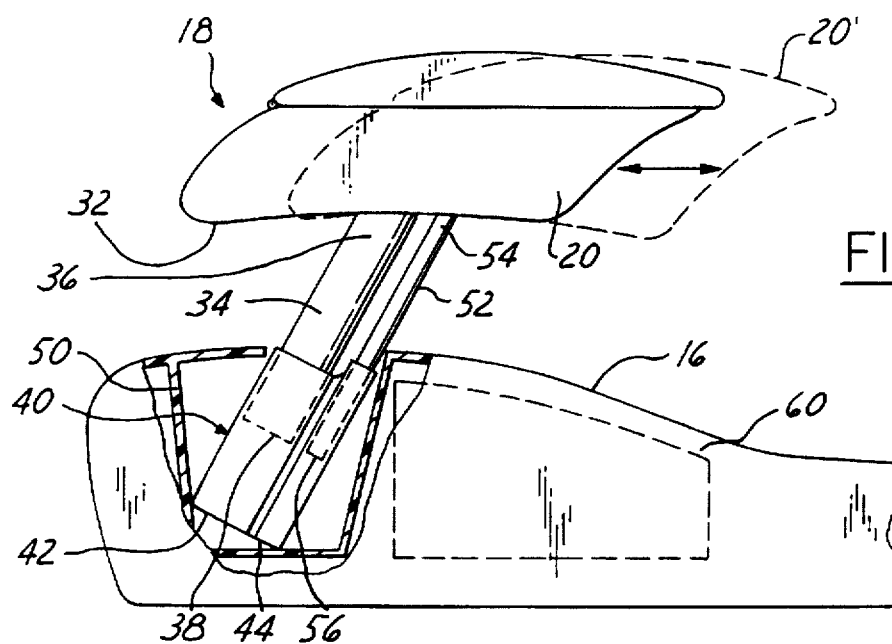

5,749,629

1

CONSOLE ASSEMBLY WITH ADJUSTABLE ARMREST

FIELD OF THE INVENTION

The present invention relates to automotive vehicle consoles in general, and more specifically to a console assembly with a diagonally adjustable armrest.

BACKGROUND OF THE INVENTION

One task of automotive interior designers is to provide vehicle drivers and passengers with an ergonomically desirable environment. This task includes considering interior seating comfort. A feature important to seat comfort is armrest position. This is so since vehicle occupants vary substantially in height, girth, and arm length, as well as armrest position preference.

Various attempts have been made to accommodate the armrest needs of occupants in automotive vehicles having a center console, typically mounted between front seats. In U.S. Pat. No. 3,356,409 (Belsky), assigned to the assignee of the present invention, ball bearings 16 are employed to slide a console body 27 having a flat upper surface relative to a tunnel 14 upon which it is situated. Another horizontally adjustable armrest 8 is shown in U.S. Pat. No. 4,934,750 (Eichler et al.). In U.S. Pat. No. 5,112,094 (Kribs), a console mounted armrest 10 is horizontally adjustable by a tongue 17 and apertures formed in a base 11 and the tongue. Radial adjustment of an armrest assembly 22 is accomplished by locating a pawl 40 in one of a plurality of teeth 48 as disclosed in U.S. Pat. No. 4,674,790 (Johnson).

The aforementioned armrests, however, do not provide the versatility required to meet the ergonomic needs of automotive vehicle occupants. Thus, a diagonally adjustable armrest is needed which allows a wide range of positions in both the vertical and horizontal directions.

SUMMARY OF THE INVENTION

The present invention overcomes the deficiencies of the related art by providing a console assembly with a vertically and horizontally adjustable armrest in an automotive vehicle. The assembly has a center console positioned between a pair of seats in the vehicle and having a mounting well and a first storage compartment therein and a second storage compartment, adjustable with respect to the console, and having a lid with an outer surface for receiving an arm of a vehicle occupant thereon. At least one telescoping member is angularly mounted with respect to a vertical axis for simultaneously adjusting the second storage compartment both in a vertical direction and in a fore-aft direction with respect to the console, the telescoping member mounted to a storage compartment bottom of the second storage compartment on a first end and mounted within the mounting well on a second end. The second storage compartment has a slide bracket attached to the storage compartment bottom for horizontally adjusting the storage compartment relative to the console. A stabilizing rod is mounted substantially parallel to the at least one telescoping member for preventing rotation of the second storage compartment about the at least one telescoping member.

An advantage of the present invention is a console assembly having a storage compartment with an armrest surface which is diagonally adjustable with respect to a floor mounted console.

Another advantage is a console assembly which provides horizontal adjustment of an armrest surface in addition to diagonal adjustability.

2

Still another advantage of the present invention is a console assembly with a stable, diagonally and horizontally adjustable armrest surface.

A feature of the present invention is a diagonally mounted telescoping member mounted in the console and attached to the armrest for providing diagonal adjustability.

Another feature is a stabilizing rod mounted parallel with the telescoping member to prevent rotation of the armrest when in an extended position.

BRIEF DESCRIPTION OF THE DRAWINGS

These and other objects, advantages, and features of the present invention will become apparent upon reading the following description with reference to the accompanying drawings, in which:

FIG. 4 is a side view of the armrest of the present invention in a seated position showing a diagonal adjustment mechanism within the console according to the present invention;

FIG. 5 is a side view similar to FIG. 4 but showing the armrest in the extended position.

DETAILED DESCRIPTION OF THE PREFER EMBODIMENT

Figure 1:
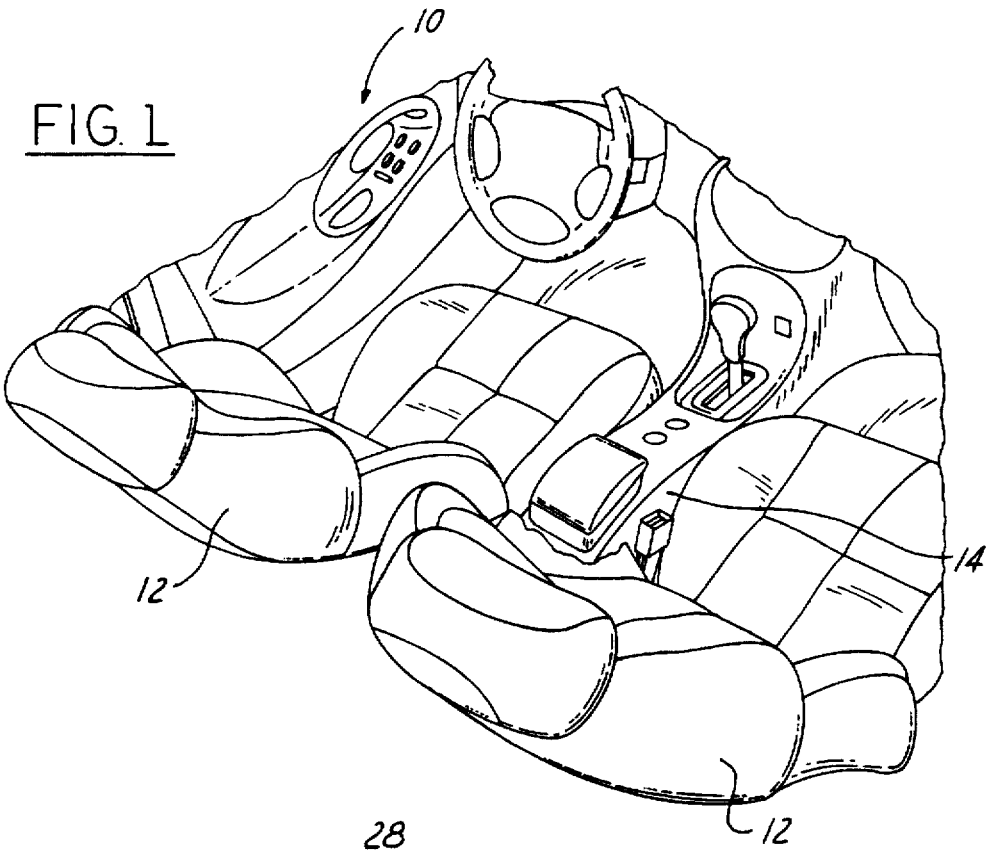
FIG. 1 is a perspective view of an automobile vehicle interior having a center console with an adjustable armrest according to an embodiment of the present invention.
Figure 2:
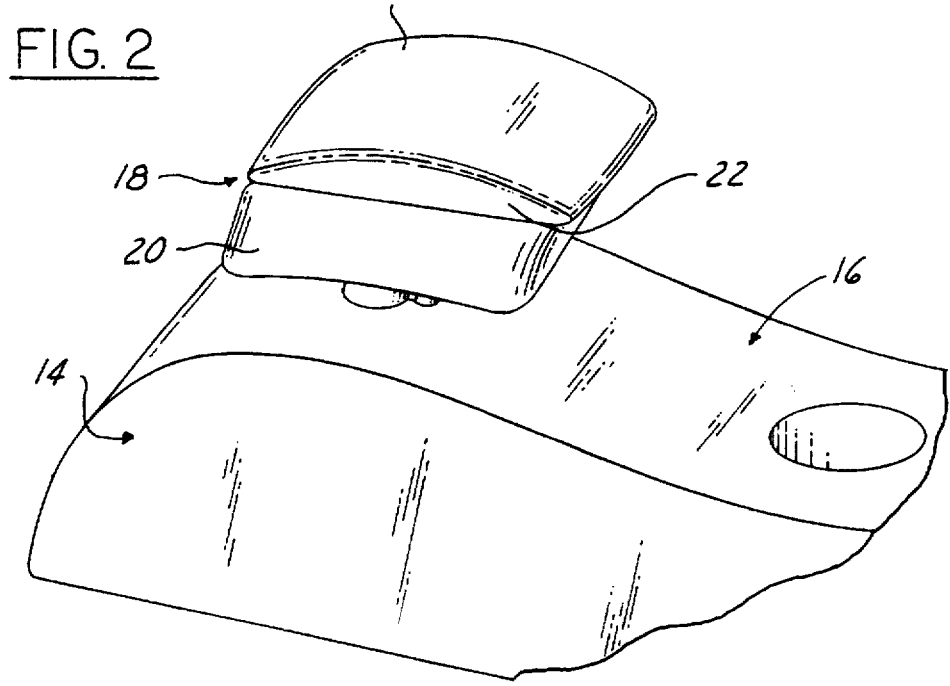
FIG. 2 is a side perspective view of a console with a storage compartment shown in an extended position and having an armrest thereon.

Turning now to the drawings, and in particular to FIG. 1, an interior 10 of an automotive is shown having a pair of seats 12 with a console assembly 14 situated therebetween. On an upper surface 16 of the console assembly 14 is an armrest assembly 18, which, as further described below, is vertically adjustable as well as horizontally adjustable in a fore-aft direction (FIGS. 1 and 2).

Figure 3:
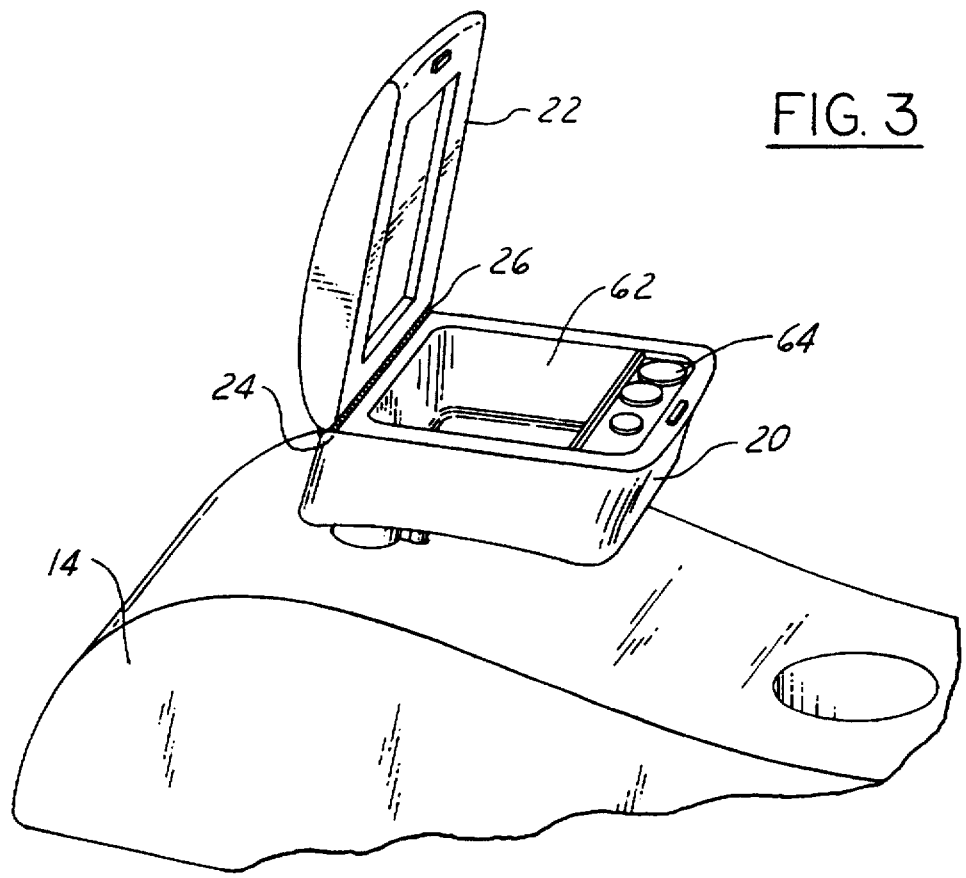
FIG. 3 is a perspective view similar to FIG. 2 shown with the lid in an open position.

As best seen in FIG. 3, the armrest assembly 18 preferably has a storage compartment 20 with a lid 22 hingedly attached alone a rear edge 24 of the storage compartment 20 with a conventional hinge 26. As seen in FIG. 2, an upper surface 28 of the lid 22 is contoured to receive an arm of a vehicle occupant (not shown).

As seen in FIG. 4 and 5, the armrest assembly 18 can be adjusted both in the vertical direction and in the horizontal direction, that is the fore-aft direction. Adjustment in the horizontal direction is accomplished by a slide bracket assembly 30 attached on an underside 32 of the storage compartment 20 (FIGS. 4 and 5). The slide bracket assembly 30 may be of similar construction to that shown in U.S. patent application Ser. No. 08/684,161, filed Jul. 19, 1996, and assigned to the assignee of the present invention.

Vertical adjustment is preferably accomplished by a telescoping member 34 having a first end 36 attached to the underside 32 of the storage compartment 20, and a second end 38 which slides within a guide sleeve 40 (FIG. 5). Preferably, the guide sleeve 40 has a first cylinder 42 and a second cylinder 44 with axes 46, 48, respectively, which are substantially longitudinally parallel (FIG. 4). The guide sleeve 40 is mounted within a well 50 in the console assembly 14, and preferably is an integral piece.

Figure 6:
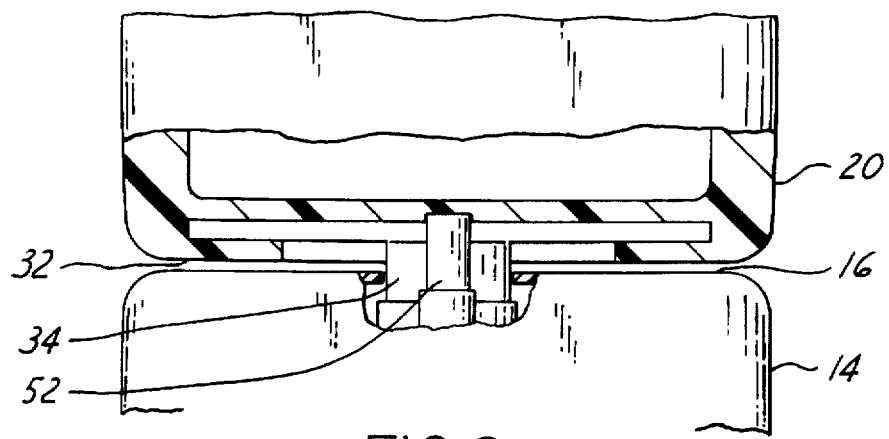
FIG. 6 is a front view of the taken along line 6 of FIG. 4.

A stabilizing rod 52 is mounted substantially parallel to the telescoping member 34, and has a first end 54 attached to the underside 32 of the storage compartment 20 and a second end 56 mounted within the second cylinder 44 of the guide sleeve 40. The stabilizing rod 52 thus prevents rotation of the storage compartment 20 about the telescoping member 34 (FIGS. 5 and 6).

The telescoping member 34 allows the storage compartment 20 to be diagonally adjustable, which for purposes of this disclosure means simultaneously adjustable in both a vertical direction and a fore-aft direction with respect to the console upper surface 16. The storage compartment 20 is thus diagonally adjustable between a retracted position in which the storage compartment underside 32 is substantially flush with the upper console surface 16 (FIG. 4), and an extended position in which the storage compartment 20 is extended vertically and in the fore-aft direction away from the upper console surface 16 (FIG. 5). Those skilled in the art will recognize that the guide sleeve 40 may be mounted within the well 50 at various angles to the vertical so as to achieve an ergonomic design for occupant comfort, and that the angle of guide sleeve 40 shown in the drawings is for illustrative purposes only. Thus, the guide sleeve 40 may be angled to the left of vertical as opposed to the right of vertical as shown in FIGS. 4 and 5. The telescoping member 34 is preferably pneumatically or hydraulically operated in a fashion known to those skilled in the art and suggested by this disclosure. The telescoping member 34 can also be mechanically operated. A catch member (not shown) on the telescoping member 34 interacts with incremental openings or slots (not shown) in the guide sleeve 40 to allow the telescoping member to be temporarily adjusted to various positions. Alternatively, the telescoping member 34 may have a series of openings therein which receive a catch member on the guide sleeve 40.

The storage compartment 20 may also be adjustable horizontally along the slide bracket 30, as seen in FIG. 5, between a first horizontal position designated by reference number 20 and a second horizontal position designated by reference number 20'. It should be understood that various positions between the first horizontal position 20 and the second horizontal position 20' are also possible, and the invention is not intended to be limited to those two positions.

With the console assembly as described, vehicle occupants may adjust the arm rest assembly 18 so as to achieve various positions both in the vertical direction and in the fore-aft direction.

The console assembly 14 of the present invention may also have an auxiliary storage compartment 60 for storing various items. The auxiliary storage compartment 60 may be substantially enclosed with respect to the vehicle interior 10, and may contain vehicle electronics and the like.

The storage compartment 20 has a storage well 62 for containing various items which the vehicle occupants may wish to store therein. In addition, the storage compartment 20 may have a conventional coin holder 64 (FIG. 3) which is accessible when the lid 22 is in an open position and coverable when the lid 22 is in a closed position (FIGS. 4 and 5).

Although the preferred embodiment of the present invention has been disclosed, various changes and modifications may be made without departing from the scope of the invention as set forth in the appended claims.

We claim:

1. A console assembly providing a vertically and horizontally adjustable armrest in an automotive vehicle, the assembly comprising:

(a) a center console adapted to extend between a pair of seats and having a mounting well and a first storage compartment therein;

(b) a second storage compartment, adjustable with respect to the console, and having a lid with an outer surface for receiving an arm of a vehicle occupant thereon;

(c) at least one telescoping member angularly mounted with respect to a vertical axis for simultaneously adjusting the second storage compartment both in a vertical direction and in a fore-aft direction with respect to the console, the telescoping member mounted to a storage compartment bottom of the second storage compartment on a first end and a telescoping member sleeve mounted within the mounting well on a second end;

(d) a slide bracket attached to the storage compartment bottom for horizontally adjusting the storage compartment relative to the console; and (e) a stabilizing rod mounted within a stabilizing rod sleeve integral with the telescoping member sleeve substantially parallel to the at least one telescoping member for preventing rotation of the second storage compartment about said at least one telescoping member.

2. A console assembly providing an adjustable armrest in an automotive vehicle, the assembly comprising:

(a) a center console adapted to extend between a pair of seats and having therein:
      (i) a mounting well; and
      (ii) a guide sleeve angularly mounted within the mounting well with respect to a vertical axis, the guide sleeve having a first cylinder and a second cylinder with substantially parallel longitudinal axes;

(b) a second storage compartment, adjustable with respect to the console, and having a lid with an outer surface to receive an arm of a vehicle occupant thereon;

(c) a telescoping member within the first cylinder of the guide sleeve for simultaneously adjusting the second storage compartment between:
      (i) a retracted position in which a storage compartment bottom is substantially flush with an upper console surface; and,
      (ii) an extended position in which the second storage compartment is extended both in a vertical direction and in a fore-aft direction with respect to the console away from the upper console surface;
   the telescoping member mounted to a storage compartment bottom of the second storage compartment on a first end and mounted within the first cylinder of the guide sleeve on a second end;

(d) horizontal adjustment means attached to the storage compartment bottom for horizontally adjusting the storage compartment relative to the console; and (e) a stabilizing rod mounted to the storage bottom on a first rod end and within the guide sleeve on a second rod end substantially parallel to the telescoping member for preventing rotation of the second storage compartment about the telescoping member.

3. An armrest assembly according to claim 2 wherein the telescoping member is pneumatically operable.

4. An armrest assembly according to claim 2 wherein the telescoping member is mechanically operable.

5. An armrest assembly according to claim 2 wherein the horizontal adjustment means comprises a bracket.

* * * * *